March 11, 1958

O. KATORSKY 2,826,247

FLOW CONTROL FOR LIQUID FUEL

Filed Sept. 4, 1956

INVENTOR
Oskar KATORSKY

BY

ATTORNEYS

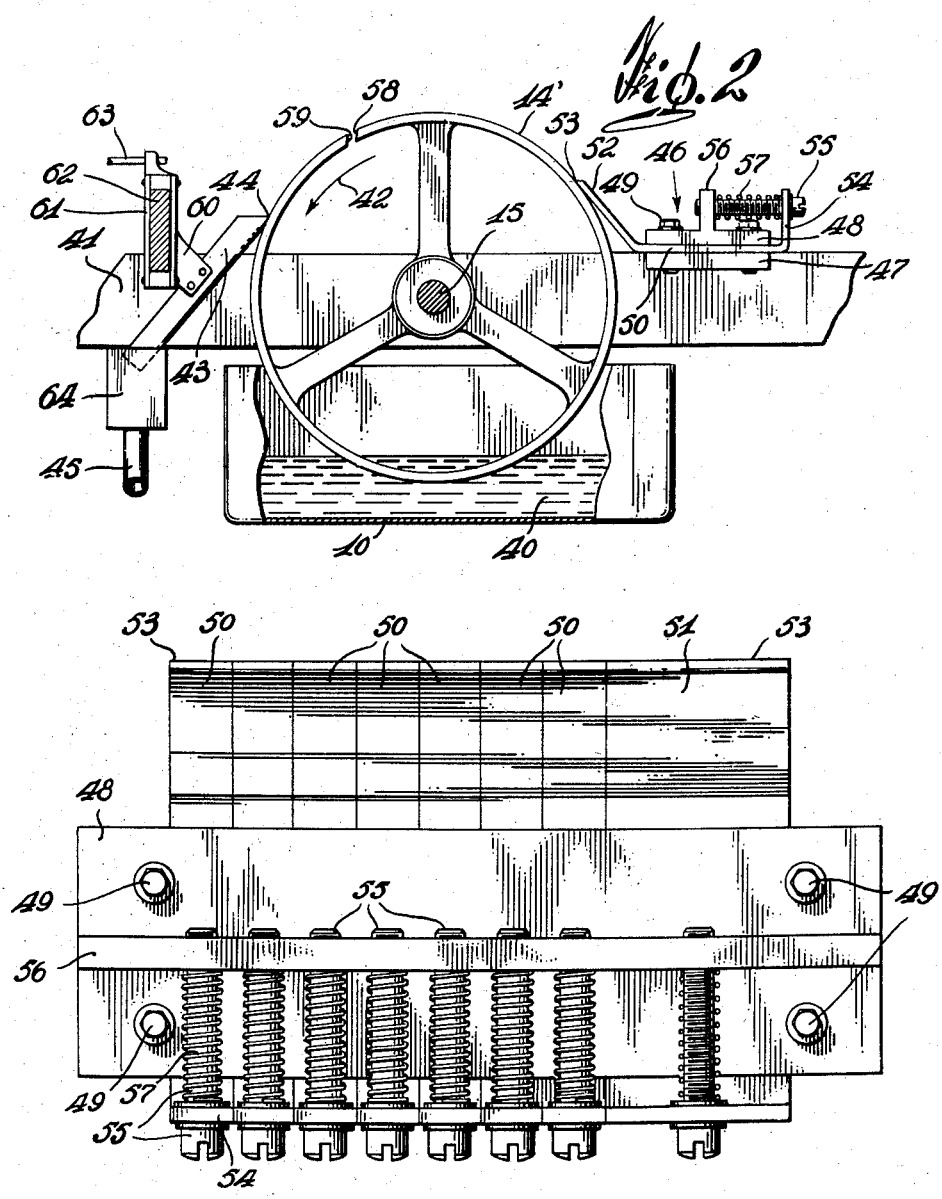

United States Patent Office 2,826,247
Patented Mar. 11, 1958

2,826,247

FLOW CONTROL FOR LIQUID FUEL

Oskar Katorsky, Montreal, Quebec, Canada

Application September 4, 1956, Serial No. 607,938

3 Claims. (Cl. 158—36)

The present invention relates to a flow control for liquid fuel and is a continuation-in-part of co-pending U. S. application Serial No. 530,960 filed August 29, 1955 now abandoned.

The present invention relates more particularly to a pressureless flow control which will deliver liquid fuel to the atomizing unit of an oil burner at a regulated rate of flow and which is preferably made as a component of an oil burner unit.

The objects of the invention are to devise a flow control for liquids, in particular fuel oil, to eliminate pressure producing equipment in the feeding of fuel oil to the atomizing unit of an oil burner, as well as filtering means; to contrive a device by which unfiltered fuel oil may be used and which will control the flow of oil accurately at the desired quantity during specified times; to contrive a flow control for liquid fuel that will accommodate fuel oils of any viscosity and/or unfiltered waste oils; to provide a flow control for liquid fuel in which the amount of fuel per hour regulated by the device is not limited by any minimum quantity, to construct a flow control for liquid fuel consisting of a unit made up of few and simple parts, simple and inexpensive to manufacture; and generally to provide a flow control for liquid fuel that is durable in construction and efficient in its use.

According to a first embodiment of the present invention, the amount of oil demanded by the load is fed to the atomizing unit of the oil burner automatically and in an accurately regulated manner provided that the temperature and/or viscosity of the oil remain constant, for instance, by providing an automatic temperature control for the fuel.

According to a second embodiment of the present invention, the flow control for the liquid fuel will regulate automatically and accurately the flow of oil to the atomizing unit of the oil burner regardless of the viscosity and/or temperature of the fuel oil whereby said second embodiment does not require any means for maintaining the temperature and/or viscosity of the liquid fuel at constant values.

Other objects of the present invention which are obtained in the second embodiment of the present invention are the addition, to the flow control according to the first embodiment, of adjustable calibrating blades to permit accurate and dependable measuring of the fuel oil to the atomizing unit of the oil burner irrespective of the viscosity of the oil and within a wide range of temperature of the oil.

Another important object of the present invention is the provision of means to prevent solid particles which may be contained in the oil, when unfiltered fuel oil is used, from lodging under the calibrating blades and accidentally varying the amount of fuel oil delivered to the atomizing unit.

Yet another important object of the present invention is the provision of a flow control which, once adjusted for a predetermined rating, will deliver a constant amount of fuel per unit time and per revolution of the rotating surface of the drum regardless of the viscosity or temperature of the oil and without employing pressure.

The foregoing and other important objects of the present invention will become more apparent during the following disclosure and by referring to the drawings in which:

Figure 2 is a side elevation, partly in section, of the second embodiment of the flow control unit; and Figure 3 is a plan view of the calibrating blades shown in Figure 2.

Figure 1:
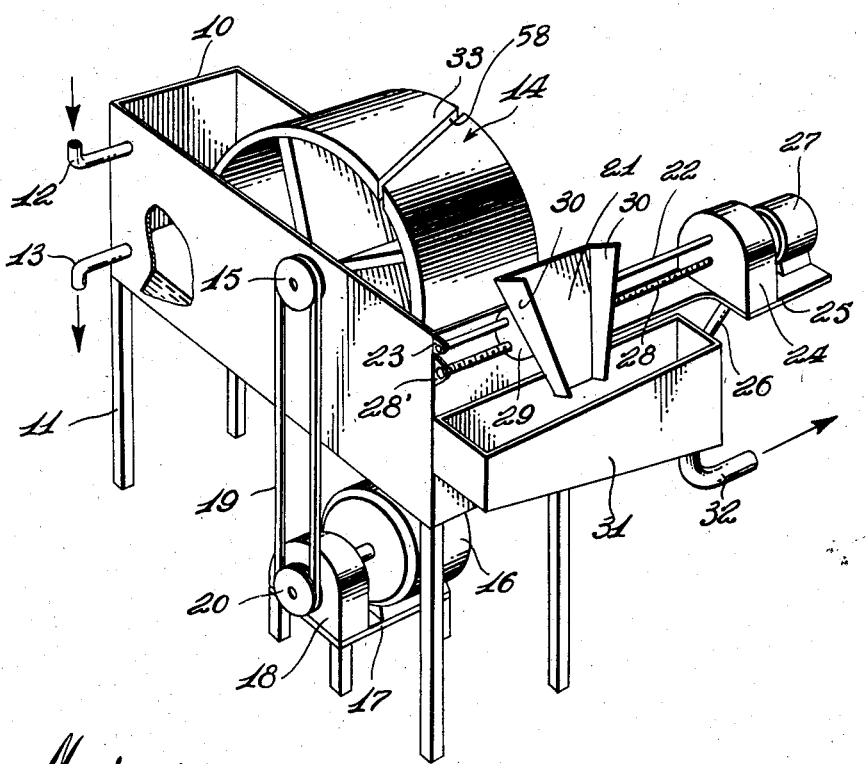
Figure 1 is a perspective view of the first embodiment of the flow control device according to the present invention.

Referring now more particularly to the drawings in which like reference characters indicate like elements throughout, the flow control unit, according to the first embodiment, consists of an open top tank, as indicated by the numeral 10, supported on legs 11 suitably mounted thereto. An inlet pipe 12 is located adjacent the top of the tank 10 at the rear thereof and an outlet pipe 13 is located towards the rear of the tank a predetermined distance from the bottom thereof. A wheel or drum 14 is mounted on a horizontal axle 15 extending transversely of the tank and being journalled in the side walls thereof. The wheel is mounted so as to have its cylindrical face 33 in the liquid contents of the tank.

The wheel is rotated at a constant speed by means of a motor 16 which is located, in this instance, beneath the tank and supported on any suitable mounting such as a small table 17, this motor being connected to a speed reducer 18. A chain or endless belt 19 engages the shaft 20 of the speed reducer and axle 15 upon which the wheel is mounted. The motor 16 is preferably an electric motor.

A take-off scoop 21 is located outside the tank at the front end thereof. This scoop or scraping blade is movable across the front end of the tank and across the face of the drum. The scoop 21 is slidably mounted on a rod 22 which is parallel to the axle 15; one end of the rod 22 is fixed to a bracket 23 mounted at the upper corner of the tank on the outside thereof, the opposite end of the rod being secured to the casing of a speed reducer 24. The speed reducer 24 is supported on a shelf 25 which is connected to the tank and extends beyond one side thereof. A supporting rod 26 connected to the underface of the shelf and to a leg of the tank provides suitable support for the shelf. A reversible or modulating electric motor 27 is supported on the shelf and drives the speed reducer 24 which in turn operates a screw feed 28 extending outward from the speed reducer, parallel with the rod 22 and journalled at its outer end in a bracket 28' which is secured to the tank 10. The mounting bracket 29 on the rear face of the scoop 21 and which slidably engages the rod 22 threadedly engages with the screw feed.

The scoop or scraper 21 is of any suitable rigid material and consists of a flat bottom tapering to a narrowed end and is provided with sides 30. An open top receptacle or drain box 31 is suitably mounted on the front end of the tank 10, extending across the end of the tank, and being located underneath the scoop 21, the lower or narrow end of which projects into the receptacle. An outlet pipe or feed line 32 is connected to the bottom of this drain box and leads therefrom to the atomizer unit of an oil burner (not shown).

According to the first embodiment, the liquid fuel in the tank 10 is maintained at a constant temperature and viscosity by means, for instance, of a suitable heating element (not shown) which is disposed in the fuel of the tank 10 and is controlled by a thermostat (not shown) responsive to the temperature of said fuel. The heating element and thermostat provide an automatic temperature control for the fuel. The modulating motor 27 is controlled in known manner by a thermostat, pressurestat or the like control made responsive to the physical state to be maintained by the oil burner.

For instance, if the oil burner is used to heat a building, the control would be a thermostat used to maintain a constant temperature in the building by controlling the modulating motor 27 so as to position the scoop 21 across the face 33 of the drum 14 according to the rate of flow of fuel needed.

In the operation of this first embodiment of the flow control for liquid fuel, the fuel oil is introduced into the tank from a supply source through the inlet 12, the oil level being predetermined and maintained at the required level by means of the overflow or outlet pipe 13 which leads to a suitable storage receptacle, the level of the fuel in the tank thus being kept constant by this continuous feed and overflow arrangement.

Oil in the tank 10 clings to or is picked up by the wheel 14 as it rotates in the tank and adheres to the face 33 of the drum. This fuel oil flow control does not require any type of filter or equipment to produce pressure. The device, according to the first embodiment shown in Figure 1, will handle unfiltered oil and will control the flow accurately at the quantity per hour desired when equipped with an automatic temperature control for the fuel as above mentioned; also the fuel oils of any viscosity and unfiltered waste oils may be used.

This fuel oil flow control, when used as a twin unit, could feed the same burner with two types of fuel oil by simply switching from one side of the twin to the other, each side of the twin unit being adapted to be adjustable for the type of fuel desired. The amount of fuel oil per hour regulated by this flow control may vary from zero when the scoop is out of contact with the wheel, to a maximum when the scoop is in full face to face contact with the wheel.

In the present instance, as hereinabove described, the unit is provided with a thermostat control for the modulating motor 27 which automatically regulates output in B. t. u. per minute to a closer tolerance and eliminates the necessity of stopping and starting the burner.

While the take-off scoop is, in this case, actuated by means of the modulating motor 27 operating the screw feed for moving the scoop back and forth across the face of the wheel, this moving of the scoop may, of course, be done manually should the device be used without an automatic modulating control and without the motor 27 for automatically regulating the flow of oil accurately at the quantity per hour desired. A preferred form of manual operation would be a hand crank device to actuate the screw feed 28.

The flow control unit, according to the second embodiment and illustrated in Figures 2 and 3, comprises, as in the first embodiment, a tank 10 and drum 14' which is partially immersed in the oil 40 in the tank 10 and which is mounted on an axle 15 journalled in the frame member 41 above the tank 10. The axle 15 is driven by a motor or the like, such as the motor 16 and speed reducer 18 of Figure 1. The drum 14' is rotated at constant speed in the direction of the arrow 42.

The tank 10 is provided with means for supplying oil to the tank and with an oil overflow (not shown) to maintain a constant oil level in the tank 10.

An upwardly inclined scoop 43, similar to scoop 21 of Figure 1, is supported with its bevelled upper edge 44 in contact with the outer cylindrical surface of the drum 14' on the side of the said drum which travels downwardly toward the tank 10. The scoop 43 has a width at its upper bevelled edge 44 substantially equal to the length of the drum 14' so as to collect all the oil which adheres to the surface of said drum when said scoop is in complete face to face relation with said drum.

The scoop 43 is supported by arms 60 which are secured to a slider 61 slidably movable on and embracing a transverse bar 62 which extends parallel to the axis of the drum and may be secured to the frame member 41. A link 63 is secured to the slider 61 and is controlled by a modulating motor (not shown) such as the modulating motor 27 of Figure 1, through a suitable mechanical linkage (not shown). Thus the modulating motor adjusts the lateral position of the scoop 43 relative to the drum 14' in a manner similar to that described in relation to the scoop 21 in the first embodiment. The scoop 43 has a restricted lower end which discharges the oil it collects into a drain box 64 similar to the drain box 31 of Figure 1, said drain box being connected to the atomizing unit of the fuel oil burner through a large diameter conduit 45. The conduit 45 has a sufficient diameter to allow the passage of all the solid particles normally contained in unfiltered fuel oil.

It will be obvious that such a fuel control requires that the temperature and the viscosity of the oil be kept at constant values in order that the coating of the oil adhering to the rotating drum may have a uniform thickness so that the oil will be collected at a uniform rate by the scoop 43 for any predetermined transverse position of said scoop relative to the drum.

According to the second embodiment of the present invention, in order to maintain the thickness of the oil coating adhering to the drum 14 constant, regardless of temperature and viscosity variations of the oil, so as to deliver to the scoop a constant quantity of oil per unit time, there is mounted on the side of the drum opposite the scoop 43 a calibrating blade assembly, generally indicated at 46, which preferably extends across the entire length of the drum 14' and which serves to control the thickness and amount of oil adhering to the surface of the drum 14' in the peripheral portion of said drum extending between the calibrating blade assembly 46 and the scoop 43, so as to adjust the amount of oil scraped by said scoop 43.

The calibrating blade assembly 46 comprises a base plate 47 which is rigidly secured to the frame 41, a top plate 48 adapted to be secured to the base plate 47 by means of bolts 49, and a plurality of calibrating blades 50 and 51 sandwiched between the base and top plates 47 and 48 respectively. There are preferably several blades 50 of equal width and one blade 51 having a width much greater than the width of the blades 50. Each blade 50, 51 has a straight portion sandwiched between the plates 47 and 48, and an upwardly inclined extension 52 terminated by a bevelled edge 53 adapted to come in close proximity or in actual contact with the outer surface of the rotating drum 14'. The rear portion 54 of each blade 50, 51 is bent upwardly at right angles and an adjusting screw 55 passes freely through a hole made in said upward extension 54 and is threaded in an upwardly extending flange 56 integral with the top plate 48. A spring 57, under compression, surrounds each adjusting screw 55, and abuts against the flange 56 and the extension 54. Thus rotation of the adjusting screw 53 will cause longitudinal displacement of the associated blades 50 and 51 towards and away from the outer surface of the drum 14'.

When the calibrating blades 50 and 51 are adjusted to leave a gap of the desired width between the rotating surface and the calibrating blades the oil coating adhering to the portion of the rotating surface beyond the blades, cannot exceed in thickness the width of the gap. With the calibrating blades properly adjusted, the oil delivered by the rotating surface to the scoop 43 can only be the amount allowed to pass per revolution of the rotating surface regardless of the viscosity or temperature of the oil. Because the blades 50 and 51 are individually adjustable it will be understood that the amount of oil allowed to pass may be varied from a minimum which is zero to a maximum limit in which all the blades are away from the rotating surface. It will be understood that the maximum limit may be itself increased by changing the physical dimensions of the drum 14', more particularly by increasing its length; the width of the scoop and of the blade assembly will be increased accordingly. The rotational speed of the drum 14' may be also adjusted to different values but only within predetermined limits: the peripheral speed, for a drum of a given diameter, must be high enough so that the oil will adhere to it in a uniform layer but not so high that the oil will leave the drum under centrifugal force.

It will be noted that the bevelled edges 53 of the blades 50 and 51 are disposed at a peripheral position with respect to the drum 14' located above the axle 15, and similarly the bevelled contacting edge 44 of the scoop 43 is disposed above the level of the axle 15.

Another feature, according to the second embodiment of the present invention, consists in providing a slot 58 in the cylindrical wall of the drum 14 or 14'. Said slot 58 extends through said wall and its sides 59 are disposed at an angle to the tangent at said slot. Moreover, the longitudinal extent of said slot makes an angle with the generatrix of the cylinder, that is, said slot extends diagonally across the face of the drum 14' or 14 as shown in Figure 1. The slot 58 serves to provide a gap in the rotating surface into which the solids that may be contained in the unfiltered fuel oil are forced by the action of the calibrating blades 50, 51 to enter said gap whereby no solid particles will lodge under the edge of the calibrating blades 50 and change the calibration of the oil coating.

When solid particles contained in the fuel oil have been in the above manner, forced in the gap or slot 58, said particles will emerge from the slot after said slot has passed beyond the blades 50, 51, due to the centrifugal action exerted thereon by the rotating drum and also due to the surface tension of the oil, to thereby come again onto the outer surface of the drum 14' to be collected by the scoop 43 and discharged to the atomizing unit of the oil burner through the large diameter conduit 45. In order to prevent the solid particles from settling down into the bottom of the tank 10 there is preferably provided a conventional bucket chain system (not shown) which constantly moves in said tank in order to stir up and keep in motion the oil contained in the tank 10 even when the oil burner has momentarily stopped firing and the flow control is not metering any fuel to the atomizing unit of the oil burner.

From the foregoing arrangement it will be obvious that the fuel oil flow control system, according to the present invention, may be used to meter unfiltered oil to the atomizing unit of a fuel oil burner, and the fact that unfiltered oil can be used constitutes one of the outstanding features of the control system. The solid particles which are present in the oil are picked up by the drum and collected by the scoop 43 and delivered to the atomizing unit of the oil burner where they are burned along with the fuel oil.

Apart from providing a means to control the thickness of the oil layer on the rotating drum so that once the blades are adjusted the thickness of the oil coating adhering to the drum will remain constant regardless of the viscosity variations of the oil, the calibrating blade assembly has the secondary advantage of providing a means to adjust the rate of delivery of the oil so that it will not be a straight line function of the position of the scoop relative to the drum. For instance, the large blade 51 can be adjusted in a more or less permanent manner upon installation of the burner equipped with this flow control so as to provide the minimum rate of delivery of fuel oil at which the oil burner can safely be fired. The remaining blades are then adjusted to provide a means to have a variable rate of delivery to suit the firing range of the burner above the minimum firing rate provided by the large blade 51. Therefore, in practice, the scoop 43 has its position of minimum oil collection opposite blade 51 to collect all the oil passed by said blade 51.

Assuming that an oil burner equipped with this flow control has been installed and that this oil burner normally would modulate from 5 gal. per hr. minimum to 20 gal. per hr. maximum. In the middle of the heating season, this would be the best and most economical rate of fire, but in the early fall or late spring such a rate of fire would not be economical and would cause the burner to be "off" more often than "on." The calibrating blades provide the means to reduce the firing range of the burner in a few minutes so as to fire, for instance, from a minimum of three gals. per hr. to a maximum of ten gals. per hr. or any rate desired within the range in which the burner would normally be able to fire.

Again the calibrating blades may be so adjusted as to take care of sudden peak loads. For instance, assuming that a fuel consumption of some three to ten gals. per hr. would normally be required but at peak loads a fuel input of not less than twenty gals. per hr. would be demanded, the blades can then be adjusted so that the scoop will deliver no more than ten gals. per hr. up to three-quarters open, that is, with the scoop 43 three-quarters of the way across the drum 14', with automatic modulation, but at the call for maximum heat output, the modulating control will then deliver an additional 10 gals. per hr. in the last quarter opening of the modulating control, that is, for positions of the scoop between three-quarters to full face to face relationship across the face of the drum 14'.

It has been found in actual tests that the oil metering unit, according to the present invention, adjusted at a given setting will deliver oil with great accuracy, more particularly, the variations in the oil flow have been found to be less than 1% in the volume of oil delivered over a long period of time. Furthermore, this accuracy has been maintained while varying the temperature of the oil from 125° F. to 200° F. Various grades of oil gave the same results provided that the oil coating on the drum was thicker than the width of the gap between the blades and the drum.

While preferred embodiments according to the present invention have been illustrated and described, it is understood that various further modifications may be resorted to without departing from the spirit and scope of the appended claims.

I claim:

1. A flow control for regulating the rate of flow of liquid fuel comprising a fuel receptacle having inlet means for the introduction of fuel thereinto from a main supply source, regulating means to maintain the fuel level in said receptacle constant, a drum rotatably mounted on said receptacle for rotation about a horizontal axis and with part thereof extending below the fuel level in said receptacle, driving means to rotate said drum, the said drum upon being rotated adapted to cause fuel in the receptacle to adhere thereto and to be removed from the receptacle, a rigid member secured to said receptacle, spaced from said drum and parallel to said horizontal axis, said member extending outwardly of one end of said drum, an inclined scoop slidably mounted for movement on said member, said scoop being downwardly inclined and having a scraping edge at its upper end, a drain box suitably supported beneath the lower end of said scoop, a fuel outlet line connected to the said drain box, the said scraping edge of said scoop adapted to come in close proximity with the drum and scrape the fuel therefrom as it is removed by the rotating drum from the receptacle, said scoop directing the removed fuel downward into said drain box to flow therefrom into said fuel outlet line, an electric modulating motor, and means operated by said motor and connected to said scoop to move the latter transversely of said drum from a position where said scraping edge is in full face to face relation with said drum to a position where said scraping edge extends beyond the end of said drum thereby to regulate the amount of fuel removed from the said drum by said scoop, and thus the amount of fuel flowing into said fuel outlet in a given or desired period of time.

2. A flow control as claimed in claim 1, further including at least one calibrating blade having an edge adapted to be in proximity with said rotating drum upstream from said scoop, and means to adjust said calibrating blade towards and away from said rotating drum in order to adjust the width of the gap between the edge of said blade and the outer face of said rotating drum, said rotating drum being provided with a slot made through the cylindrical wall thereof to receive any solids contained in the fuel and avoid their lodging between the face of the drum and the edge of the blade.

3. A flow control as claimed in claim 2, wherein the side walls of said slot make an angle with a tangent to said cylindrical wall at said slot, and said slot extends diagonally across the face of said drum with respect to the axis of rotation of said drum.

References Cited in the file of this patent

UNITED STATES PATENTS

| | | |
|---|---|---|
| 2,117,958 | Hershey | May 17, 1938 |
| 2,291,046 | Lange | July 28, 1942 |

FOREIGN PATENTS

| | | |
|---|---|---|
| 344,625 | Italy | Nov. 13, 1936 |